March 20, 1945.　　P. W. THORNHILL　　2,372,137
SHOCK ABSORBER
Filed May 24, 1943　　2 Sheets-Sheet 1

Inventor
Peter Warburn
Thornhill
by Stevens and Davis
his attorneys

March 20, 1945.  P. W. THORNHILL  2,372,137
SHOCK ABSORBER
Filed May 24, 1943  2 Sheets-Sheet 2
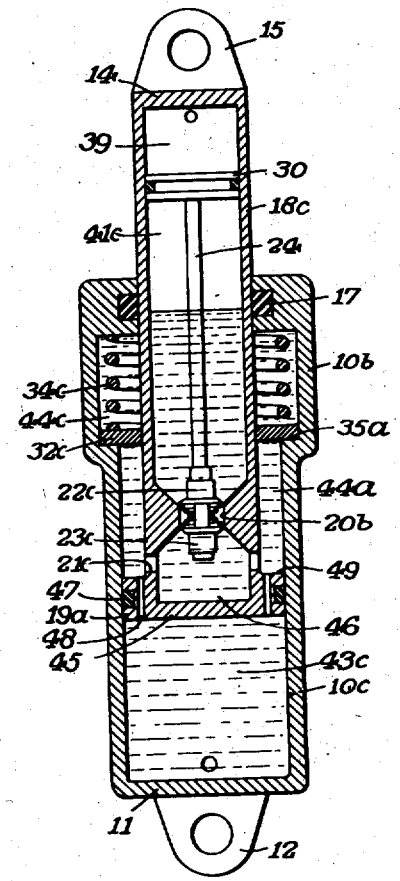
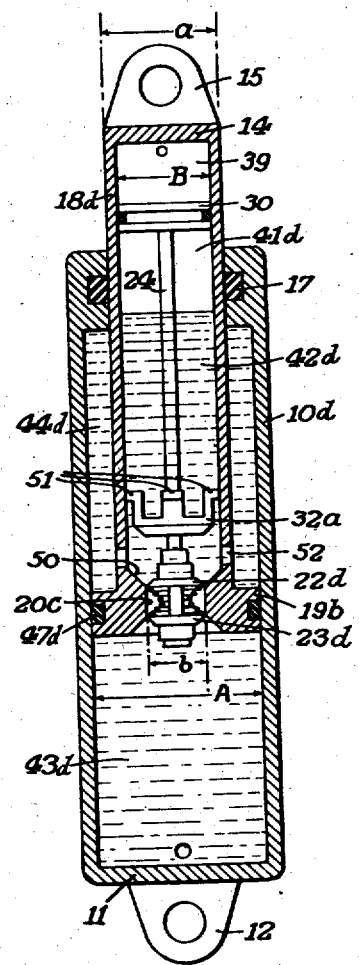
Inventor
Peter Warton Thornhill
by Stevens and Davis
his attorneys Patented Mar. 20, 1945

2,372,137

UNITED STATES PATENT OFFICE 2,372,137

SHOCK ABSORBER

Peter Warborn Thornhill, Leamington Spa, England, assignor to John Henry Onions, Coventry, England Application May 24, 1943, Serial No. 488,262
In Great Britain May 11, 1942

10 Claims. (Cl. 267—64)

This invention relates to shock absorbers and particularly to shock absorbing suspension devices for vehicles in which a quantity of liquid is used for hydraulically dampening the movements of a pair of telescopic members connected respectively to the wheel mounting or equivalent and the vehicle chassis or equivalent, respectively.

It is the object of the invention to provide improvements in such shock absorbing devices whereby augmented damping is obtained when the movement of the parts exceeds a predetermined value, thus rendering the device especially suitable for heavy vehicles and the like intended for traversing rough roads and country.

According to the invention there is provided a shock absorbing device comprising a pair of telescopic members defining a working space of variable volume, resilient means for supporting resiliently a normal load on the shock absorbing device, liquid damping means disposed within said variable volume space, and an auxiliary working space which decreases in volume as the end of the recoil stroke of the telescopic members is approached, wherein liquid ejected from said auxiliary space during the recoil stroke is forced into another working space against the pressure created therein by resilient means, whereby the said rejected liquid tends to increase the pressure in said other working space. It will, of course, be appreciated that the recoil stroke refers to movement of the shock absorbing device in such a direction that the stress in the resilient means for supporting the normal load is being reduced. The resistance is conveniently produced by the force exerted by the resilient means which supports the normal load.

The invention is illustrated by way of example in the accompanying drawings, in which:

Figure 4 is a diagrammatic sectional elevation of a modified form of shock absorber; and Figure 5 is a similar view of a further modification.

Figure 1:
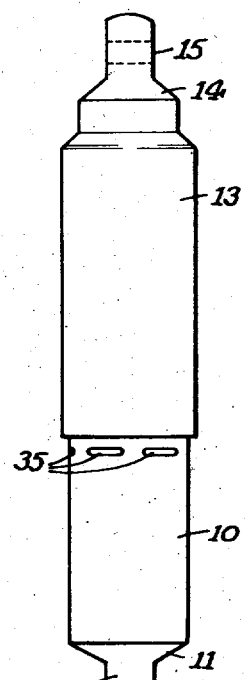
Figure 1 is a side elevation of one construction of telescopic shock absorber.
Figure 3:
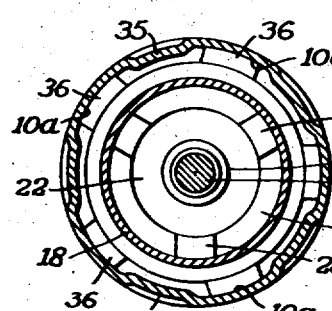
Figure 3 is a sectional plan taken on the line 3—3 of Figure 2.
Figure 2:
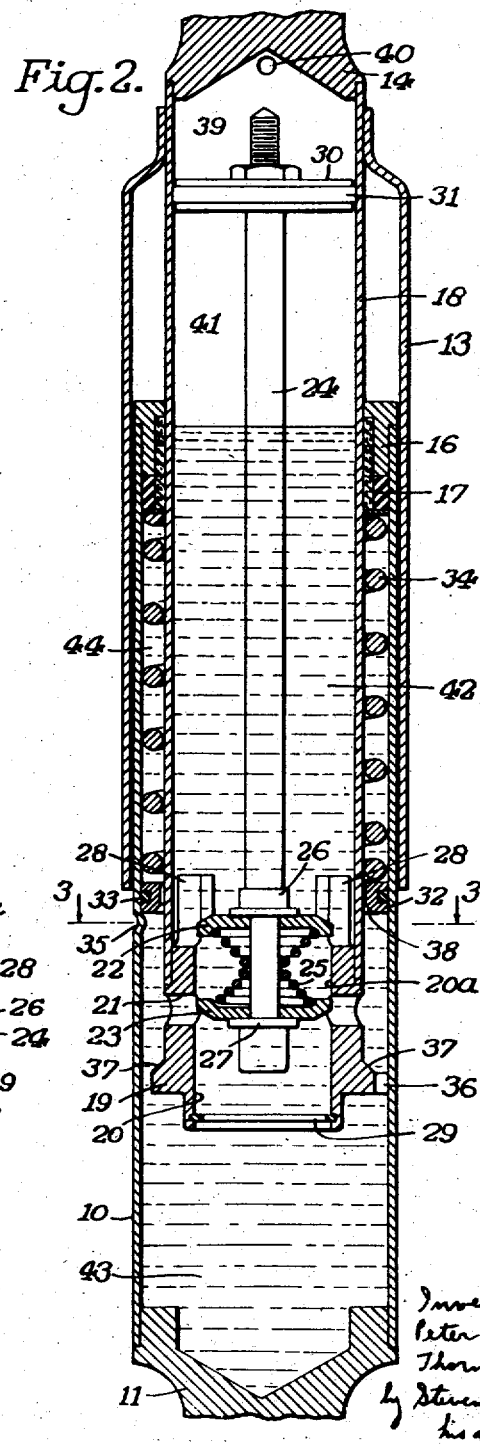
Figure 2 is a sectional elevation of the shock absorber shown in Figure 1, drawn to a larger scale.

The shock absorbing device shown in Figures 1, 2 and 3 is intended primarily for incorporation in the suspension of a motor road vehicle and is suitable for relatively heavy vehicles, owing to the provision of the improved means for checking the recoil stroke when the wheel rebounds after having struck a bump.

Referring to Figure 1, the device comprises a cylinder 10 which is closed at its lower end by a plug 11 having a lug 12 which is bushed for pivotal attachment to the axle or equivalent of the vehicle. The upper part of the device includes an outer tube 13 into which the cylinder 10 is arranged to slide, the tube 13 constituting a dust shield connected with the plunger tube, which will be hereinafter described. The upper end of the plunger tube is closed by a plug 14 having an upper fixing lug 15 for pivotal attachment to the vehicle body or equivalent. Thus as the wheel moves upwards and downwards relative to the vehicle body or equivalent the cylinder 10 slides into and out of the tube 13 in a telescopic manner; it will be noted that the lugs 12 and 15 should be mounted so that angular movement of one relative to the other about the axis of the device is substantially prevented in order that the proper functioning of the shock absorber may be attained.

The internal construction of the device is shown in Figures 2 and 3. It will be seen that the cylinder 10 is provided at its upper end with a bearing ring 16 serving as a support for a packing 17, which latter bears in a fluid-tight manner against a relatively slidable plunger tube 18 secured to the dust shield 13 and to the upper closure plug 14. The bottom or inner end of the plunger tube 18 is fitted with a head 19 which is bored throughout its length, as indicated at 20, to a diameter less than the internal diameter of the plunger tube 18 so as to form a constriction. A plurality of radial passages 21 extend through the head 19, and the portion 20a of the bore 20 disposed above said passages is arranged to cooperate with a pair of saucer-shaped damping valve members 22 and 23 so as to produce a damping valve device operating in the manner described in my patent application Serial No. 471,484, filed January 6, 1943, now Patent No. 2,336,137, issued December 7, 1943. The damping valve members 22 and 23 are independently slidable upon an axial rod 24 and they are urged apart by a coiled compression spring 25 so that they normally engage with a pair of collars 26 and 27 secured to the axial rod 24. The damping valve members 22 and 23 are of such a diameter that they slide freely but with little clearance within the bore 20 and they are normally separated by a distance which is slightly greater than the axial length of the portion 20a of the bore. In order to support the damping valve members in a truly coaxial position when both are disposed above the upper limit of the portion 20a a plurality of longitudinal guide members 28 are provided, the inwardly facing surfaces of which virtually constitute extensions of the surface of the bore 20. Excessive downward movement of the damping valve members 22 and 23 is prevented by a stop ring 29 fitted into the lower part of the bore 20. At its upper end the axial rod 24 is fitted with a control piston 30, this being freely slidable within the plunger tube 18 and having in a groove at its periphery a packing ring 31 which is not completely airtight; the packing ring 31 is purposely arranged to allow a slight leakage of air past the control piston 30 in order to allow said piston to function in the manner which is fully described in my above-mentioned application.

An annular recoil valve member 32 fitted with a fluid-tight packing ring 33 is arranged to slide freely in the upper part of the cylinder 10, but is normally urged downwards by a coiled compression spring 34 into engagement with a circumferential series of stops 35, one of which is seen in Figure 2. The stops 35 are conveniently constituted by elongated inwardly directed bulges pressed into the cylinder tube 10 so as to leave between them undeformed portions of tube, as indicated at 10a in Figure 3, for the passage of a circumferential series of guides 36 formed upon the plunger head 19, thus allowing the latter to make its full stroke within the cylinder 10. The reason for mounting the shock absorbing device so as to prevent relative rotation between the lugs 12 and 15 is, of course, in order that the guides 36 may slide between the stops 35 without fouling the latter. The plunger head 19 is formed with an upwardly directed frusto-conical seating 37, which is adapted to engage in a substantially liquid-tight manner with a corresponding frusto-conical surface 38 upon the recoil valve member 32 as the plunger 18 rises relative to the cylinder 10 during a heavy recoil stroke of the shock absorbing device. The internal diameter of the recoil valve member 32 is substantially larger than that of the plunger tube 18.

A control space 39 above the control piston 30 contains compressed air, which is conveniently pumped in through a passage 40, said air extending past the piston 30 and filling under pressure a space 41 within the plunger 18. The remainder of the internal space within the plunger is occupied by damping liquid, which is indicated at 42, and this liquid extends past the damping valve device 22, 23 into the cylinder space 43; it also occupies the annular space 44 which surrounds the lower part of the plunger 18 and is herein termed the "auxiliary" space.

The operation of the improved shock absorbing device is as follows; the action of the damping valve device will only be described briefly, as its full operation is given in the above-mentioned specification. The compressed air within the spaces 39 and 41 serves as a resilient element or spring pressing downwards upon the liquid in the plunger 18 and therefore placing the whole liquid content of the shock absorber under pressure so that the device is capable of supporting resiliently the normal static load which the vehicle wheel is required to bear. The parts are shown in Figure 1 in the positions which they occupy during normal running of the vehicle. Slight inequalities in the road surface cause continual surging of the damping liquid between the spaces 42 and 43 and tend to maintain the damping valve members 22 and 23 respectively just above and just below the portion 20a of the bore 20; at the same time the pressures of the air in the spaces 39 and 41 become substantially equalised by the slow leakage which is permitted past the control piston 30. However, when the wheel encounters a bump the sudden upward movement of the cylinder 10 causes liquid to be expelled from the space 43, and this liquid forces upwards the damping valve member 23 until the latter reaches a position above the bore 20a, the liquid thereafter flowing freely into the plunger space 42 and causing the compression of the air in the space 41 to be increased. This rise of pressure is, of course, substantially instantaneous and the air is therefore unable to flow sufficiently rapidly past the packing 31 to increase correspondingly the pressure of air in the control chamber 39; instead the control piston 30 is urged upwards by the increased pressure below it, and thus the control rod 24 is lifted to a position in which the lower damping valve member 23 blocks the bore 20a. The air pressure within the space 41 is therefore prevented from accentuating the recoil stroke or downward movement of the cylinder 10 which occurs when the bump has been passed, for the control rod 24 remains in an elevated position until the pressure within the cylinder space 43 drops to such a low value that the reduced upward thrust of said liquid upon the lower damping valve member 23 counteracts the increased upward pressure upon the control piston 30. Thus the damping valve device 22, 23 closely regulates the return of liquid from the plunger space 42 to the cylinder space 43, so producing smooth running with little "bounce." The slight leakage permitted past the control piston 30 by the packing 31 enables the pressures in the spaces 39 and 41 to become equalised, say over a period of some minutes, and consequently automatically adjusts the shock absorbing device to suit any changes in what is termed the normal static load.

The action of the improved arrangement for checking the recoil or extension of the shock absorber is as follows. During normal running of the vehicle over moderately smooth roads the plunger head 19 occupies approximately the position shown in Figure 2 and the recoil damping valve 32 rests upon the stops 35, said valve member being held against said stops by the spring 34. The encountering of a relatively serious bump by the wheel, however, first causes the shock absorbing device to be severely shortened, thus considerably compressing the air in the space 41. As a result the recoil or extension stroke is apt to take place in a violent manner, especially when the vehicle concerned is a heavy one, and it is found that in these circumstances the damping valve device 22, 23 is hardly capable by itself of checking the recoil. Therefore as the recoil stroke proceeds and the plunger 18 approaches the end of its permissible movement, the frusto-conical seating 37 upon the piston head 19 engages in a substantially liquid-tight manner with the recoil valve member 32. This causes the auxiliary space 44 to be sealed from the cylinder space 43, the control rod 24 being in a lowered position with the damping valve member 23 below the passage 21, thus blocking the bore 20. Therefore, as upward movement of the plunger 18 continues, the volume of the auxiliary space 44 is reduced and liquid is forced out of said space into the plunger space 42. Considerable resistance or opposition is, however, encountered by said liquid, as, of course, the pressure of the air in the space 41 has to be overcome. In addition the spring 34 has to be compressed, but this is relatively light. As a result of bringing the auxiliary space 44 into action the recoil stroke is rapidly brought to an end, after which the shock absorbing device again extends and resumes its normal operating length, the recoil valve member 32 being left in engagement with the stops 35 so as to place the auxiliary space 44 once again into free communication with the cylinder space 43.

In the modified construction of shock absorbing device shown diagrammatically in Figure 4, the cylinder 10c is enlarged at its upper part, as indicated at 10b, a shoulder 35a being arranged to act as a stop for the recoil valve member 32c, which latter is in the form of a flat annular washer. The recoil valve member 32c is urged against the shoulder by the coiled compression spring 34c and it has a freely slidable fit both within the enlarged portion 10b and along the plunger 18c. At a short distance from its lower end the plunger is formed with a bore 20b with which the damping valve members 22c and 23c co-operate. The lower end of the plunger 18c is closed by a wall 45 and the space 46 between this wall and the damping valve device 22c, 23c communicates with an annular space 44a surrounding the plunger 18c by way of a plurality of radial passages 21c. The lower end of the plunger 18c is formed with a piston head 19a which is provided with a substantially liquid-tight packing 47 sliding within the cylinder 10c. The piston head 19a has longitudinal passages 48 which normally form a means of communication between the cylinder space 43c and the annular space 44a. Also the upper surface 49 of the piston head 19a is plane so that as the plunger rises said surface is engaged by the under surface of the flat recoil valve member 32c, which latter then closes the passages 48.

The action of the device shown in Figure 4 is substantially the same as the preceding example. The lower end of the plunger 18c is normally in free communication with the cylinder space 43c by way of the radial passages 21c and the passages 48 in the piston head 19a. When, however, a recoil stroke of excessive magnitude occurs the piston head 19a engages the recoil valve member 32c and lifts the latter away from the shoulder 35a. During continued movement of the plunger the liquid from the auxiliary space 44c cannot escape through the passages 48 to the cylinder 43c and is therefore obliged to flow through the radial passages 21c into the plunger 18c, thus additionally increasing the pressure of the air in the space 41c and rapidly damping out the recoil stroke.

The shock absorbing device shown in Figure 5 also includes a damping valve device and control piston of the form described in my patent application Serial No. 471,484, and in this case the operation of the recoil valve member is directly dependent upon said damping valve device. The hollow plunger 18d is slidably mounted in the cylinder 10d as before and the lower end of said plunger is formed with a piston head 19b having a substantially liquid-tight packing ring 47. Also the piston head is formed with a bore 20c through which the damping valve members 22d and 23d are slidable. Adjacent the upper end of the bore 20c the plunger is formed with a frusto-conical seating 50 which is adapted to be engaged by a recoil valve member 32a in the form of a disc having a chamfered lower edge while its upper part is provided with arms which slide within the plunger 18d. The recoil valve member 32a is secured firmly to the control rod 24 so that the latter is centralised by the arms 51. When the control piston 30 is moved downwards to its full extent the recoil valve member 32a engages with the seating 50 in a substantially liquid-tight manner and thus closes the bore 20c. The auxiliary space 44d surrounding the plunger 18d is filled with damping liquid, which latter communicates through radial passages 52 with the interior of the plunger.

The operation of the shock absorbing device shown in Figure 5 during normal running is the same as in the preceding examples, except that the liquid which is contained within the auxiliary space 44d is always in communication with the plunger space 42d and therefore affects the characteristics of the device. When a heavy shock is received and the plunger is approaching the end of the extending or recoil stroke, the reduction in pressure which occurs in the space 41d of the plunger causes the compressed air within the control space 39 to force down the control piston 30 until the recoil valve member 32a blocks the upper end of the bore 20c. During the recoil stroke the auxiliary space 44d is, of course, being reduced in volume but in normal running the liquid therefrom can return through the radial passages 52 and past the damping valve device 22d, 23d to the cylinder space 43d. When, however, the recoil valve 32a closes, this flow of liquid is stopped and therefore the liquid rejected from the auxiliary space 44d has to be forced into the space 42d of the plunger, consequently raising the pressure of the air in the space 41d. This imposes considerable resistance upon the flow of the liquid and has the effect of rapidly damping out the recoil stroke.

With liquid damped telescopic suspension devices such as those illustrated it is desirable in most cases that the axial load on the shock absorber for each particular point in the working stroke should have a predetermined value, and moreover that the load for each point in the shortening stroke should have a particular relationship to the load at the same point during the lengthening or recoil stroke. For the efficient operation of the shock absorber it is desirable that the load-carrying thrust (exerted on account of the compressed air or other resilient means) for any given position of the plunger relative to the cylinder should, during the compression of the shock absorber, be greater than the normal static load, and moreover the thrust at the same point in the following extension or rebound stroke should be less than the said normal static value. Preferably also for any given position of the cylinder and plunger tubes the amount by which the thrust during shortening is greater than the static load should be substantially equal to the amount by which the thrust at the same point in the recoil stroke is less than the static load. This relationship can be obtained in the arrangement shown in Figure 5 by selecting an appropriate cross-sectional area for the bore 20c, taking into account the internal cross-sectional area (marked A) of the cylinder, the cross-sectional area of the outside of the plunger $a$, and the internal cross-sectional area of the plunger space 42 (marked B). If the cross-sectional area of the bore 20c is $b$, then the desired relationship is given by the formula $a/A = 2b/B$. Thus if the cross-sectional area A of the cylinder is equal to one-and-a-half times the cross-sectional area $a$ of the plunger, then the cross-sectional area $b$ of the bore 20c is preferably substantially equal to three-quarters of the internal plunger area B.

It will, of course, be understood that the invention is capable of being applied to various forms of oleo-pneumatic shock absorbing devices and that the arrangements which have been described are given merely by way of example.

What I claim is:

1. A shock absorbing device comprising a cylinder, a hollow plunger sliding therein, the outside diameter of the plunger being substantially smaller than the interior of the cylinder so as to leave an annular auxiliary space surrounding the plunger, damping liquid in the cylinder and extending into the annular space, flow restricting means within said plunger, said plunger having openings therethrough normally establishing communication between said flow restricting means and the cylinder and annular auxiliary spaces, an annular recoil valve member slidable in the cylinder and normally urged resiliently against a stop, and on the plunger a projection which is arranged to engage the recoil valve member as the end of an extension stroke is approached and which, in conjunction with said recoil valve member, isolates said annular space from the cylinder space, said projection thereafter causing the recoil valve member to be moved along the cylinder with the plunger as the said extension stroke continues, whereby the liquid can escape from the auxiliary space only against the resistance of the flow restricting means which resistance counteracts further extension of the shock absorbing device.

2. A shock absorbing device as claimed in claim 1, wherein the stop against which the recoil valve member is normally positioned comprises a circumferential series of projections directed inwardly from the wall of the cylinder.

3. A shock absorbing device as claimed in claim 1, wherein the stop against which the recoil valve member is normally positioned comprises a circumferential series of projections directed inwardly from the wall of the cylinder, and wherein the inner end of the plunger is formed with a plurality of radial guiding projections spaced around its circumference to engage slidably with the cylinder and to pass between the stop projections upon said cylinder.

4. A shock absorbing device as claimed in claim 1, wherein the flow restricting means within the plunger comprises a control piston within the outer end of the plunger, an axial rod reduced to the control piston and extending through a constriction adjacent the inner end of the plunger, and a pair of valve members mounted upon the rod so as to be movable within the said constriction.

5. A shock absorbing device as claimed in claim 1, wherein a coiled compression spring disposed within the annular space bears against the annular recoil valve member to maintain it normally in engagement with the stop on the cylinder.

6. A shock absorbing device comprising a cylinder, a hollow plunger extending thereinto and having at its inner end a piston head slidably engaging the cylinder wall, a fluid-tight packing upon the cylinder and engaging with the plunger, which latter is substantially smaller in diameter than the cylinder so that an annular auxiliary space of variable volume is provided around the plunger, damping liquid in the cylinder, the plunger, and the auxiliary space, resilient means in the plunger placing said damping liquid under pressure, a damping valve device in the piston head controlled by fluid pressure within the plunger, an opening in the plunger wall communicating with the annular space, and a recoil valve member operatively connected with the damping valve device to close the passage through said damping valve device when the shock absorbing device approaches its fully extended condition.

7. A shock absorbing device as claimed in claim 6, wherein the damping valve device comprises a control piston disposed within the plunger at the outer end part thereof, an axial rod from the control piston extending through a constriction at the inner end of the plunger, and a pair of damping valve members having a limited sliding movement upon the rod so as to control the liquid passage through the constriction in a manner depending upon the position of the control piston.

8. A shock absorbing device as claimed in claim 6, wherein the damping valve device comprises a control piston disposed within the plunger at the outer end part thereof, an axial rod from the control piston extending through a constriction at the inner end of the plunger, and a pair of damping valve members having a limited sliding movement upon the rod so as to control the liquid passage through the constriction in a manner depending upon the position of the control piston, and wherein the said recoil valve member is provided upon the axial rod and serves to close the constriction when the control piston moves as far as a predetermined position in a direction towards the inner end of the plunger, thus causing liquid ejected from the auxiliary space during lengthening of the shock absorber device to be forced through the said opening or openings into the plunger against the force of the fluid pressure in said plunger.

9. A hydraulic shock absorber comprising a cylinder, a plunger tube mounted therein with clearance to define therewith an annular working space between the plunger and cylinder normally in communication with the latter, damping valve means in said tube for controlling liquid flow between its interior and the cylinder space, a piston also in said tube, resilient means intermediate said piston and the liquid in said tube, said resilient means acting on the liquid in said plunger tube and on both sides of said piston for supporting said plunger tube and said cylinder in one relative position under static load conditions, means connecting said damping valve means and said piston to cause the former to move in response to fluctuations in the load on the said resilient means, the connecting means holding the damping valve in substantially closed position under static load conditions, and means responsive to relative extension from normal position of said plunger tube and cylinder of a predetermined magnitude for isolating said annular working space from said cylinder space to cause the annular working space to discharge against the resistance of said resilient means.

10. A shock absorbing device comprising a cylinder, a hollow plunger sliding therein, the outside diameter of the plunger being substantially smaller than the interior of the cylinder so as to leave an annular auxiliary space surrounding the plunger, damping liquid in the cylinder and extending into the annular working space, an annular projection extending radially outwardly from said plunger, flow restricting means within and near the inner end of said plunger, the inner end of said plunger being closed and its interior communicating normally with the cylinder space by an opening in the wall of the plunger and thence along the annular surrounding space and past the said projection, and an annular recoil valve member slidable in the cylinder and normally urged resiliently against a stop, the projection on the plunger being adapted to engage the recoil valve member as the end of an extension stroke is reached, said projection and annular recoil valve member coacting to isolate the annular auxiliary working space from the cylinder space whereby the liquid can escape from the annular auxiliary space only into the inner end of the plunger against the resistance of the flow restricting means which resistance counteracts further extension of the shock absorbing device.

PETER WARBORN THORNHILL.

CERTIFICATE OF CORRECTION.

Patent No. 2,372,137.   March 20, 1945.

PETER WARBORN THORNHILL.

It is hereby certified that error appears in the printed specification of the above numbered patent requiring correction as follows: Page 3, first column, line 70, for "ring 47" read --ring 47d--; page 4, first column, line 56, claim 4, for "reduced" read --secured--; and that the said Letters Patent should be read with this correction therein that the same may conform to the record of the case in the Patent Office.

Signed and sealed this 12th day of June A. D. 1945.

Leslie Frazer (Seal)   Acting Commissioner of Patents.

rounding the plunger, damping liquid in the cylinder and extending into the annular working space, an annular projection extending radially outwardly from said plunger, flow restricting means within and near the inner end of said plunger, the inner end of said plunger being closed and its interior communicating normally with the cylinder space by an opening in the wall of the plunger and thence along the annular surrounding space and past the said projection, and an annular recoil valve member slidable in the cylinder and normally urged resiliently against a stop, the projection on the plunger being adapted to engage the recoil valve member as the end of an extension stroke is reached, said projection and annular recoil valve member coacting to isolate the annular auxiliary working space from the cylinder space whereby the liquid can escape from the annular auxiliary space only into the inner end of the plunger against the resistance of the flow restricting means which resistance counteracts further extension of the shock absorbing device.

PETER WARBORN THORNHILL.

CERTIFICATE OF CORRECTION.

Patent No. 2,372,137. March 20, 1945.

PETER WARBORN THORNHILL.

It is hereby certified that error appears in the printed specification of the above numbered patent requiring correction as follows: Page 3, first column, line 70, for "ring 47" read --ring 47d--; page 4, first column, line 56, claim 4, for "reduced" read --secured--; and that the said Letters Patent should be read with this correction therein that the same may conform to the record of the case in the Patent Office.

Signed and sealed this 12th day of June, A. D. 1945.

Leslie Frazer (Seal) Acting Commissioner of Patents.